Jan. 8, 1957   N. J. MOSELY   2,776,796
HEATING AND COOLING CONTROL VALVE
Filed Oct. 15, 1952
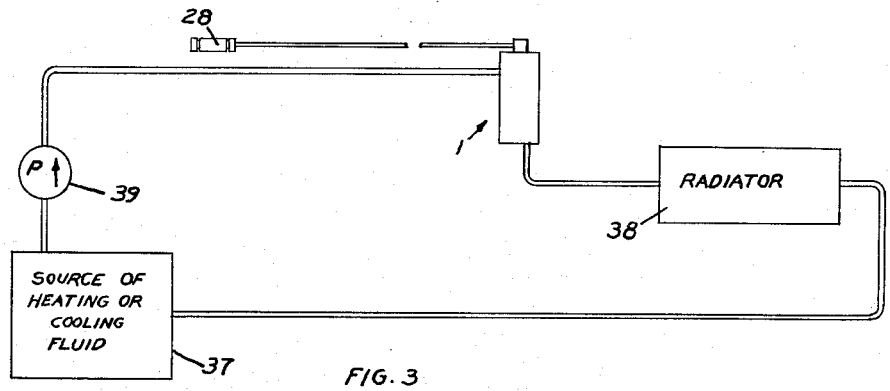
FIG. 3
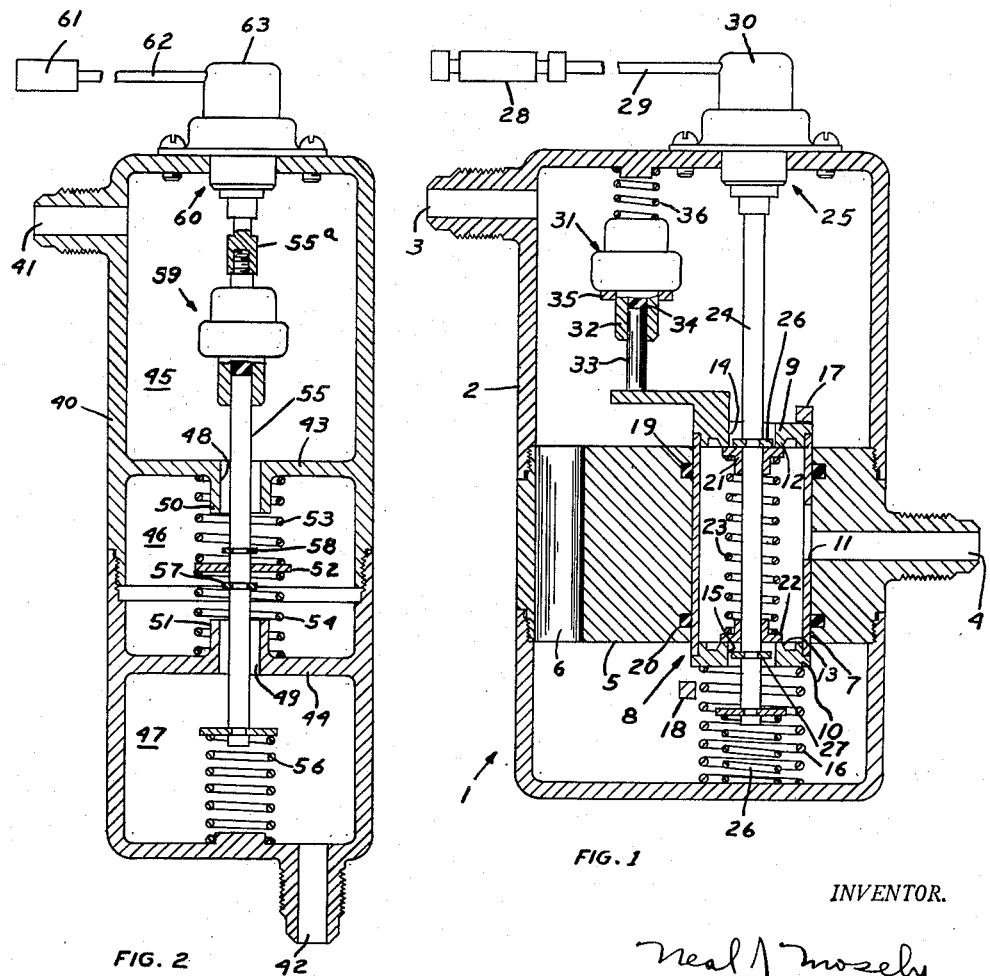
FIG. 1
FIG. 2
INVENTOR.
Neal J Mosely

United States Patent Office 2,776,796
Patented Jan. 8, 1957

2,776,796

HEATING AND COOLING CONTROL VALVE

Neal J. Mosely, Mount Lebanon, Pa., assignor to Detroit Controls Corporation, Detroit, Mich., a corporation of Michigan Application October 15, 1952, Serial No. 314,847

10 Claims. (Cl. 236—1)

This invention relates to new and useful improvements in thermostatically operated valves and more particularly to a single valve for controlling both heating and cooling fluids.

In recent years there has arisen in the heating and air conditioning industry a demand for a combined heating and cooling system which will provide efficient heating during winter months and cooling during the summer months. The form which such systems has taken is generally a simple radiation type system in which a heating fluid is used for winter operation and a cooling fluid for summer operation. In systems of this type, it has proved highly desirable to have a single thermostatically operated valve which will modulate the flow of heating or cooling fluid in accordance with room temperature and which will reverse its operation automatically in response to a change in the heat exchange fluid from heating to cooling operation or vice versa.

Accordingly, it is one of the objects of this invention to provide an improved thermostatic valve for controlling heating and cooling fluids in an air conditioning system.

Another object of this invention is to provide a thermostatic valve of improved construction which will reverse its operation automatically in accordance with the change from a heating to a cooling fluid in the system which it controls.

Another object is to provide a heating and cooling control valve which is simply and inexpensively constructed and easy to install and operate.

Other objects will become apparent from time to time throughout the specification and claims as hereinafter related.

This invention comprises the new and improved construction and combination of parts which will be described more fully hereinafter and the novelty of which will be particularly pointed out and distinctly claimed.

In the accompanying drawings, to be taken as a part of this specification, there are clearly and fully illustrated two preferred embodiments of this invention, in which drawings:

Figure 1 is a more or less diagrammatic view in longitudinal central section of a heating and cooling control valve which embodies one form of this invention.

Fig. 2 is a more or less diagrammatic view in longitudinal central section of another form of heating and cooling control valve, and Fig. 3 is a diagrammatic view of a heating or cooling system utilizing a valve of the type shown in Figs. 1 and 2.

Referring to the drawings by characters of reference, and more particularly to Figure 1, there is shown a thermostatic valve 1 comprising a valve casing 2 having an inlet 3 and an outlet 4. Within the valve casing 2 there is positioned an enlarged partition member 5 having a longitudinal passage 6 for flow of fluid therethrough and a guide passage 7 in which there is reciprocally guided a valve seat member 8. The outlet passage 4 opens laterally from the guide passage 7 in the partition member 5. The valve seat member 8 is of tubular construction and has end walls 9 and 10 and a side aperture 11 which registers with the outlet passageway 4. The end walls 9 and 10 have valve seats 12 and 13 with valve ports 14 and 15, respectively, therein. The valve seat member 8 is held by a spring 16 against an abutment 17 in the casing 2 in a predetermined initial position. The valve seat member 8 is slidably movable in the passage 7 and is limited in its movement by a second abutment 18 in the casing 2. Within the guide passage 7 there are rubber sealing rings 19 and 20 which prevent leakage around the valve seat member. Within the valve seat member 8 there are positioned a pair of valve members 21 and 22 which cooperate with the valve seats 12 and 13, respectively. A spring 23 is interposed between the valve members 21 and 22 and urges each against its respective valve seat. A valve stem 24 extends longitudinally of the valve casing through the valve ports 14 and 15 and the valve members 21 and 22. The valve stem 24 is actuated by a power element 25 and is opposed by a spring 26 at the lower end thereof. The valve stem 24 has a sliding fit in the valve members 21 and 22 and is movable relative thereto. The valve stem 24 has secured thereon upper and lower abutments or collar members 26 and 27, respectively. The power element 25 may be of any conventional type, but is preferably of the remote responsive type having an exterior bulb element 28 connected by a capillary 29 to the power element casing 30. A power element which would be particularly adapted for use in this type of valve is shown in Patent No. 2,657,711 to Earnest J. Dillman granted November 3, 1953, entitled Actuating Mechanism. Within the valve casing 2, there is positioned a thermostatic power element 31 which is responsive to the temperature of fluid passing through the valve. The power element 31 may be of any conventional type, but is preferably of the type which utilizes the expansive force of a change of state in an organic material such as is described in Patent No. 2,259,846 to Sergius Vernet. The power element 31 comprises a casing having a thermally expansive material therein and has a guide sleeve portion 32 in which there is positioned an operating plunger 33. The plunger 33 is moved by expansion of the thermostatic material within the power element casing operating through a thrust transmitting plug 34. The power element 31 is held against a stop or abutment 35 in the casing 2 by a spring 36.

*Operation*

The valve which has been thus described is particularly adapted for use in a heating or cooling system as shown in Fig. 3, and the operation thereof will be explained in connection with such an arrangement. In Fig. 3, there is shown a diagrammatic view of the heating or cooling system in which there is a source of heating or cooling fluid 37 such as a boiler or a cooling heat exchanger. The source of heating or cooling fluid is connected to a radiator or other room heat exchanger 38 in a closed circuit. The heating or cooling fluid is circulated by a pump 39 or may be circulated by the thermosyphon effect caused by the difference of temperature at the source of fluid and the radiator. The flow of fluid into the individual radiator 38 is controlled by the thermostatic valve 1 whose bulb element 28 responds to the temperature of the room or other space being heated or cooled by the radiator 38. When a cooling fluid is being circulated through the valve 1, the thermostatic power element 31 is contracted and the spring 16 is operable to hold the valve seat member 8 in its initial position against the stop 17. In this position the valve member 21 is positioned in operating engagement with the abutment 26 on the valve stem 24. In this position the valve member 21 is opened upon rise in temperature at the bulb element 28 which would cause a downward movement of the valve stem 24.

This valve, therefore, is operated to permit an increasing flow of cooling fluid from the inlet 3 through the valve port 14 and out through the outlet 4 upon occurrence of an increased temperature at the bulb element 28. When the system is changed to supply a heating fluid to the radiator 38, the thermostatic power element 31 will expand in response to the increased temperature and move the valve seat member 8 downward until it engages the stop 18. Any additional response by the power element 31 due to excessively hot heating fluid will be taken up by a reactive movement of the power element 31 against the spring 36. When the valve seat member 8 is moved to its downward position against the stop member 18, the valve members 21 and 22 will be moved therewith so that the valve member 22 is in operating engagement with the abutment member 27 on the valve stem 24. In this actuated position of the valve seat member 8, the valve stem 24 is operable to open the valve member 22 upon decrease in temperature at the remote bulb element 28.

From the foregoing description, it is seen that there is herein provided a thermostatically actuated valve having alternately actuated members whose actuation is determined by their position relative to the actuating abutment members on the valve stem 24. The relation of the valve members to the abutments on the valve stem 24 is in turn determined by the position of the valve seat member 8 according to the state of response of the power element 31.

In Fig. 2, there is shown another form of thermostatically operated valve in which the operation is changed automatically upon changing from a heating to a cooling fluid. In this valve, there is a casing 40 having an inlet 41 and an outlet 42. The casing 40 has partitions or wall members 43 and 44 dividing the same into chambers 45, 46, and 47. The walls 43 and 44 have valve ports 48 and 49 therein which open through the valve seat portions 50 and 51, respectively. In the central chamber 46, there is positioned a valve member 52 which is cooperable with the valve seats 50 and 51 according to the direction of movement thereof. The valve member 52 is urged away from each of the valve seats by springs 53 and 54 engaging the same on opposite sides thereof. A valve stem 55 extends longitudinally of the casing 40 through the valve ports 48 and 49 and through the valve member 52. The valve member 52 has a sliding fit on the stem 55 so that the stem may have movement relative to the valve member. The movement of the valve stem 55 is opposed by a spring 56 in the outlet chamber portion 47. The valve stem 55 has abutments or collar members 57 and 58 on opposite sides of the valve member 52 for engagement with said valve member to determine the direction of movement thereof relative to the valve seats 50 and 51. The valve stem 55 has formed integrally therewith a thermostatic power element 59 which is substantially identical with the power element 31 shown in Fig. 1. The power of element 59 is threadedly connected to a second valve stem portion 55ª which extends from a power element 60. The power element 60 is substantially the same as the power element 25 in Fig. 1 and has a remote responsive element 61 connected by a capillary tube 62 to the power element casing 63.

Operation

In operation, this valve functions very similarly to the one shown and described in Fig. 1. In this form of valve, there is provided a single valve member 52 which is operated by the valve stem 55 according to the relation of the abutments 57 and 58 to the valve member. As shown in Fig. 2, the valve is in an intermediate position as might occur when there is neither a heating or cooling fluid passing through the valve. When a cooling fluid is circulated through the valve, the power element 59 contracts and shortens the valve stem 55, 55ª to engage the abutment 57 with the valve member 52 so that the valve member 52 will close with decreasing temperature at the bulb element 61 and open with increasing temperature. When a heating fluid is circulated through the valve, the power element 59 will expand to lengthen the valve stem 55, 55ª. When the valve stem is lengthened by expansion of the power element 59, the abutment 58 will be engaged with the valve member 52 so that an increase in temperature at the bulb element 61 will cause the valve stem 55 to move downward and close the valve member 52 against the valve seat 51. In this stage of operation, a decrease in temperature will cause the valve member 52 to move toward open position.

From the foregoing description, it is seen that there is provided in this type of valve an arrangement whereby the flow of heating or cooling fluid is controlled automatically in response to changes in temperature of the space being heated or cooled. There is herein provided a single valve member which is operated automatically toward one or the other of two adjacent valve seats to control the flow of heating or cooling fluid, the valve member being operable to throttle the flow of a cooling fluid upon decrease in room temperature and to throttle the flow of a heating fluid upon increase in room temperature. The reversal of operation of the valve according to the temperature of the fluid passing through the valve is effected automatically by a thermostatic power element which lengthens or shortens the valve stem to determine which of two abutments engages the valve member.

Although there have been shown only two preferred embodiments of this invention, it will be obvious to those skilled in the art that other embodiments are possible without departing from the scope and intent of this invention, which should be limited only by the appended claims.

Having thus described the invention, what is claimed and is desired to be secured by Letters Patent of the United States is:

1. In a thermostatic valve, a valve casing having an inlet and an outlet, a pair of valve seats defining valve ports within said casing, said valve ports being spaced from each other, valve means positioned between and cooperable with said valve ports to control flow through said casing, thermostatic means responsive to external temperature for operating said valve means to open one of said valve ports; said thermostatic means including an operating member having two points of operating engagement with said valve means, one causing one of said valve ports to be opened, and the other causing the other of said valve ports to be opened; and thermostatic means operable to shift the relation of said operating member to said valve means in accord with the temperature of the fluid passing through said valve so that one of said points of engagement is established for a heating fluid and the other for a cooling fluid.

2. In a thermostatic valve, a valve casing having an inlet and an outlet, a pair of valve seats defining valve ports within said casing, said valve ports being spaced from each other, valve means positioned between and cooperable with said valve ports tto control flow through said casing, thermostatic means responsive to external temperature for operating said valve means to open one of said valve ports; said thermostatic means including an operating member movable relative to said valve means, said member having a pair of abutments thereon engageable at different points on said valve means, one of said abutments being engageable with said valve means at one point to cause one of said valve ports to be opened, and the other of said abutments being engageable with said valve means at another point to cause the other of said valve ports to be opened; and thermostatic means operable to shift the relation of said operating member to said valve means in accord with the temperature of the fluid passing through said valve so that one of said points of engagement is established for a heating fluid and the other for a cooling fluid.

3. In a thermostatic valve, a valve casing having an inlet and an outlet, a pair of valve seats defining valve ports within said casing, said valve ports being spaced from each other, valve means positioned between and cooperable with said valve ports to control flow through said casing, a valve stem extending through said valve means and movable relative thereto, thermostatic means responsive to external temperature to move said valve stem to open one of said valve ports, said valve stem having a pair of abutments engageable at different points on said valve means, one of said abutments being engageable with said valve means at one point to control movement thereof relative to one of said valve ports, the other of said abutments being engageable with said valve means at another point to control movement thereof relative to the other of said valve ports, and thermostatic means positioned for response to temperature of the fluid flowing through said valve and operable to shift the relation of said valve stem to said valve means to effect the engagement of one abutment for a cooling liquid and the other abutment for a heating liquid.

4. In a thermostatic valve, a valve casing having an inlet and an outlet, a pair of valve seats facing each other and defining valve ports within said casing, said valve ports being spaced from each other, valve means positioned between and cooperable with said valve ports to control flow through said casing, a valve stem extending through said valve means and movable relative thereto, a thermostatic power element including a remote responsive bulb element responsive to external temperature to move said valve stem to open one of said valve ports, said valve stem having a pair of abutments engageable at different points on said valve means, one of said abutments being engageable with said valve means at one point to control movement thereof relative to one of said valve ports, the other of said abutments being engageable with said valve means at another point to control movement thereof relative to the other of said valve ports, and a thermostatic power elements positioned within said casing for response to temperature of the fluid flowing through said valve and operable to shift the relation of said valve stem to said valve means to effect the engagement of one abutment for a cooling liquid and the other abutment for a heating liquid.

5. In a thermostatic valve, a valve casing having an inlet and an outlet, a pair of valve seats facing each other within said casing and defining spaced valve ports, a valve member movable between said valve seats, a valve stem extending through said valve ports and said valve member and movable relative to said valve member; a pair of abutments on said valve stem, spaced on opposite sides of said valve member, and engageable therewith to move the same in opposite directions; a thermostatic power element responsive to external temperature and connected to move said valve stem, and a thermostatic power element positioned for response to fluid temperature in said casing and connected to said valve stem to shift the position thereof relative to said valve member to engage one of said abutments therewith in the presence of a heating fluid and the other abutment in the presence of a cooling fluid.

6. In a thermostatic valve, a valve casing having an inlet and an outlet, a pair of valve seats facing each other within said casing and defining spaced valve ports, a valve member movable between said valve seats, a valve stem extending through said valve ports and said valve member and movable relative to said valve member; a pair of abutments on said valve stem, spaced on opposite sides of said valve member, and engageable therewith to move the same in opposite directions; a thermostatic power element responsive to external temperature and connected to move said valve stem, and a thermostatic power element positioned for response to fluid temperature in said casing and connected as a part of said valve stem and operable to expand and contract to shift the position thereof relative to said valve member to engage one of said abutments therewith in the presence of a heating fluid and the other abutment in the presence of a cooling fluid.

7. In a thermostatic valve, a valve casing having an inlet and an outlet, a pair of walls partitioning said casing into three chambers, a pair of valve seats facing each other, one on each of said walls and defining spaced valve ports, a valve member movable between said valve seats, a pair of springs engaging opposite sides of said valve member to urge the same away from each of said valve seats, a valve stem extending through said valve ports and said valve member and movable relative to said valve member; a pair of abutments on said valve stem, spaced on opposite sides of said valve member, and engageable therewith to move the same in opposite directions; a thermostatic power element including a bulb element responsive to external temperature, said power element being connected to move said valve stem, and a thermostatic power element positioned for response to fluid temperature in said casing and connected as a part of said valve stem and operable to expand and contract to shift the position thereof relative to said valve member to engage one of said abutments therewith in the presence of a heating fluid and the other abutment in the presence of a cooling fluid.

8. In a thermostatic valve, a valve casing having an inlet and an outlet, a movable valve seat member including a pair of inwardly facing valve seats defining spaced valve ports, a pair of valve members cooperable one with each of said valve seats, a valve stem extending through said valve ports and said valve members and movable relative to said valve members, a pair of abutments on said valve stem spaced on the outer sides of said valve members and engageable one with each for control thereof, a thermostatic power element responsive to external temperature connected to said valve stem for movement thereof, and a thermostatic power element positioned for response to fluid temperature in said casing and connected to said valve seat member to move the same to one position for a heating fluid and another position for a cooling fluid, said valve seat member moving said valve members therewith so that one of said valve members engages one of said abutments in said one position and the other of said valve members engages the other of said abutments in said other position.

9. In a thermostatic valve, a valve casing having an inlet and an outlet, a movable valve seat member including a pair of inwardly facing valve seats defining spaced valve ports, a pair of valve members cooperable one with each of said valve seats, a spring interposed between said valve members and urging each toward its respective valve seat, a valve stem extending through said valve ports and said valve members and movable relative to said valve members, a pair of abutments on said valve stem spaced from and on the outer sides of said valve members and engageable one with each for operating movement thereof, a thermostatic power element responsive to external temperature connected to said valve stem for movement thereof, and a thermostatic power element positioned for response to fluid temperature in said casing and connected to said valve seat member to move the same to one position for a heating fluid and another position for a cooling fluid, said valve seat member moving said valve members therewith so that one of said valve members engages one of said abutments in said one position and the other of said valve members engages the other of said abutments in said other position.

10. In a thermostatic valve, a valve casing having an inlet and an outlet, a tubular valve seat member having inwardly facing valve seats defining valve ports in the ends thereof and a side opening registering with said outlet, a pair of valve members within said valve seat member cooperable one with each of said valve seats, a spring interposed between and engaging said valve members and urging each toward its respective valve seat, said valve seat member being guided for reciprocal movement in said casing and having a predetermined initial position, a valve stem extending through said valve ports and valve members and movable relative thereto, a pair of abutments on said valve stem spaced on the outer sides of said valve members, one of said abutments engaging one of said valve members when said valve seat member is in said initial position, said valve seat member being operable upon movement to another position to move said valve members therewith and position the other of said valve members in engagement with the other of said abutments, a thermostatic power element including a remote responsive bulb element and connected to move said valve stem to operate the valve member in engagement with one of said abutments, a thermostatic power element positioned for response to fluid temperature in said casing and connected to move said valve seat member, and said last-named power element being operable to position said valve seat member in said initial position in response to a cooling fluid and in said other position in response to a heating fluid so that flow of cooling fluid will be controlled by said one valve member and heating fluid by said other valve member.

References Cited in the file of this patent

UNITED STATES PATENTS

| | | |
|---|---|---|
| 2,463,598 | Carson | Mar. 8, 1949 |
| 2,495,226 | Crago | Jan. 24, 1950 |
| 2,575,100 | Duey | Nov. 13, 1951 |